United States Patent [19]

Eubank

[11] 4,200,305
[45] Apr. 29, 1980

[54] TRAILER ASSEMBLY FOR CARRYING OVERWIDTH LOADS

[76] Inventor: Marcus P. Eubank, P.O. Box 7576, Longview, Tex. 75602

[21] Appl. No.: 932,914

[22] Filed: Aug. 11, 1978

[51] Int. Cl.² ............................................. B60P 3/40
[52] U.S. Cl. .................................. 280/404; 248/346; 280/81 R; 280/405 R; 280/474; 280/489
[58] Field of Search ................. 280/404, 407, DIG. 8, 280/483, 81 R, 30, 32, 415 R, 415 B, 405 R, 474, 476 R, 489; 54/143; 248/346, 647

[56] References Cited

U.S. PATENT DOCUMENTS

| | | | |
|---|---|---|---|
| 1,996,695 | 4/1935 | Bigley | 280/404 |
| 2,523,211 | 9/1950 | Hedgpeth | 280/405 R |
| 2,613,946 | 10/1952 | Anderson | 280/474 |
| 3,019,927 | 2/1962 | Sheehan | 280/404 |
| 3,232,636 | 2/1966 | Buchanan | 280/404 |
| 3,697,098 | 10/1972 | Fisher | 280/404 |

FOREIGN PATENT DOCUMENTS

| | | | |
|---|---|---|---|
| 705343 | 4/1941 | Fed. Rep. of Germany | 280/404 |
| 1562963 | 4/1969 | France | 280/415 R |

Primary Examiner—Robert R. Song
Assistant Examiner—Randall A. Schrecengost
Attorney, Agent, or Firm—Wofford, Fails & Zobal

[57] ABSTRACT

A trailer assembly for carrying overwidth loads such as large rectangular concrete slabs. The trailer includes two separate units, a front unit and a rear unit. Each unit includes a frame mounted on a set of tandem wheels. The front unit has upper and lower frames rotatably connected together, allowing the wheels to turn with respect to the upper frame. A tongue is hingedly connected to the front unit. It has a hitch for connection to the towing vehicle and a compression device to apply weight to the hitch for compressive connection with the towing vehicle. Longitudinal cross members are mounted across the front and rear units to support the load. The cross members can be removed and stored parallel to the length of the units for legal width return trip towing. On return trip, the rear unit is towed reverse to the direction towed while loaded. Also disclosed is an embodiment employing two units the same or similar to the front unit to enable being moved laterally to facilitate parking in close space.

10 Claims, 8 Drawing Figures

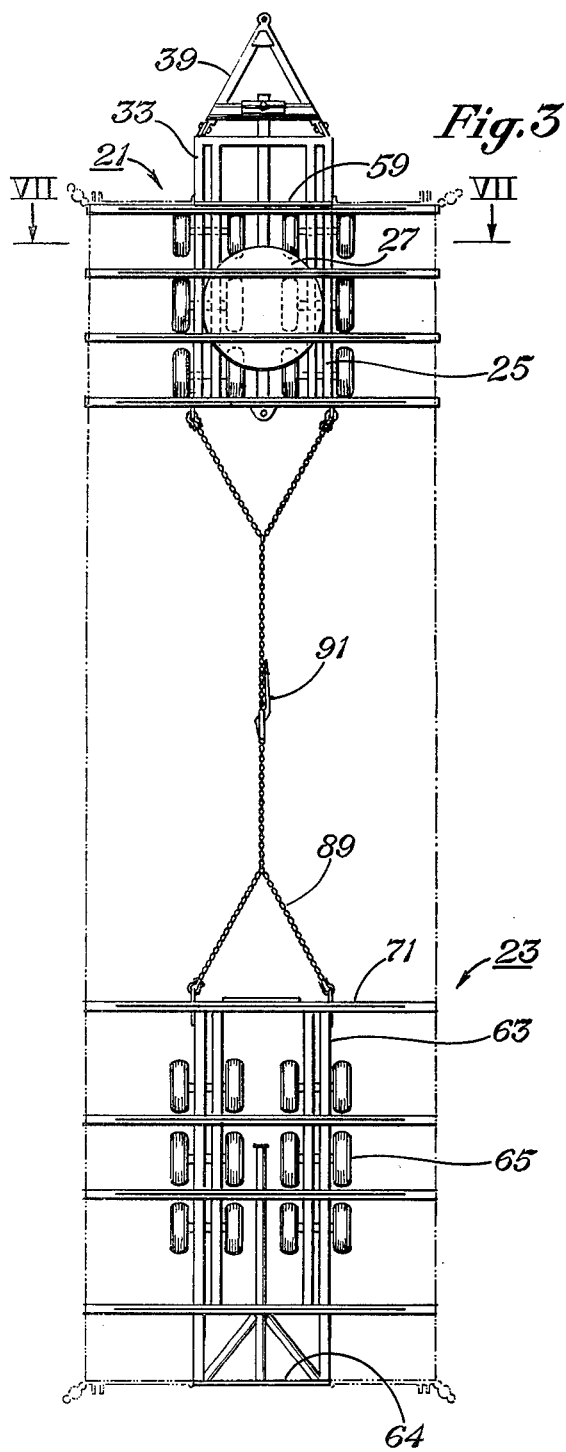
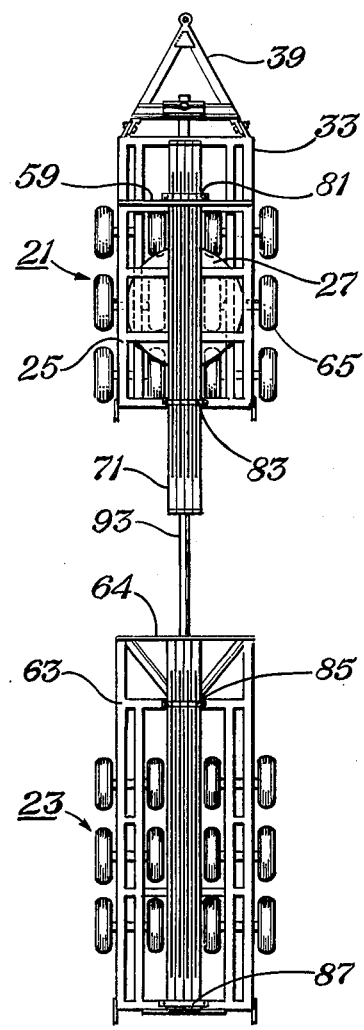
Fig.3
Fig.4
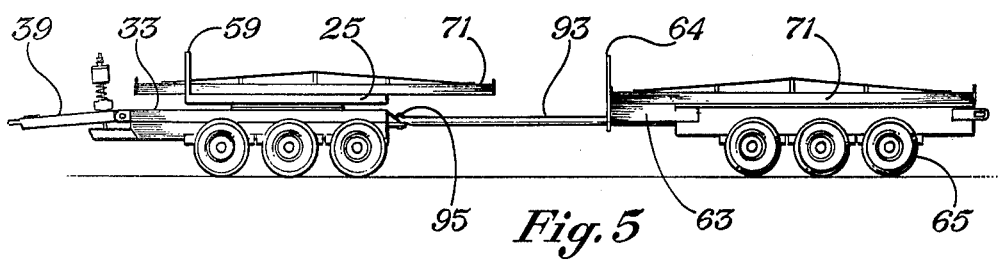
Fig.5

TRAILER ASSEMBLY FOR CARRYING OVERWIDTH LOADS

BACKGROUND OF THE INVENTION

1. Field of the Invention

This invention relates in general to trailers and in particular to a trailer assembly for carrying overwidth loads.

2. Description of the Prior Art

In my prior U.S. Pat. No. 3,944,242, I disclose a concrete slab building wherein the slab is formed at the factory and towed to the site. The building may also be constructed at the factory. It is also possible to relocate the building with its slab later, thus the combination may be considered to be a mobile home with a concrete slab floor.

Various wheel assemblies are proposed in the above patent for towing the slab to the site. All of the proposals have a single central set of tandem wheels, leaving the rear end unsupported. While these proposals may be satisfactory, a trailer assembly with more support is desired.

Also, better trailer assemblies are desirable in other areas of overwidth hauling, such as house moving. Normally a pair of longitudinal steel beams provide the support, with tandem wheels being located at the rear end. The front end has a fifth wheel hitch assembly for mounting on the fifth wheel at the back of the tractor. Even though the beams are underslung, the fifth wheel mounting and large rear wheels place the building several feet above the ground. For clearance purposes, it is desirable to keep the structure as close as possible to the ground.

When positioning a mobile home or moving a house, there are occasions when it would be helpful to shift the structure laterally. Other buildings or structures may prevent the tractor from maneuvering the structure into place by moving forward and backing.

Another desirable feature is to be able to convert the trailer assembly to legal highway width for empty return trips. Overwidth vehicles require special permits and in some states may be movable only on certain days of the week and only with a flag car.

SUMMARY OF THE INVENTION

It is accordingly a general object of this invention to provide an improved trailer assembly for hauling loads, including even overwidth loads.

It is the further object of this invention to provide an improved trailer for hauling overwidth loads that provides support at both the front and rear ends, and is of low height.

It is the further object of this invention to provide an improved trailer assembly for hauling overwidth loads that can move the load laterally, that provides overwidth support and converts to legal width while empty.

In accordance with these objects, a trailer assembly is provided that comprises two separate units, a front unit and a rear unit. Each unit has a frame mounted on a set of wheels, thus the load is supported both at the front and rear. The units can be moved independently of each other, but are linked by the load and by a chain when loaded. The front unit has an upper and lower frame rotatably mounted to each other, allowing the lower frame and attached wheels to turn with respect to the upper frame. The tongue is connected to the lower frame and to the towing vehicle. The tongue is vertically pivotal with respect to the frame and has a compression device for applying weight to the end of the hitch for compressive connection with a towing vehicle, as for transferring weight, better interconnection and traction.

Cross members are mounted to the frames of the units and extend laterally outward past the edges of the wheels. These provide support for the load and are reconfigured for empty, or return, trips. In one embodiment, the wheels of the rear unit do not have the capacity to turn with respect to the load. In an alternate embodiment, however, a rear unit the same or similar to the front unit is used, allowing both the wheels on the front and rear to turn for lateral movements.

BRIEF DESCRIPTION OF THE DRAWINGS

FIG. 3 is a top plan view of the trailer of FIG. 1, with the load shown in phantom.

FIG. 4 is a reduced top plan view of the trailer assembly of FIG. 1, with the assembly being shown in the unloaded return trip position.

FIG. 5 is a side elevational view of the trailer assembly of FIG. 1 with the assembly being shown in the unloaded return trip position.

DESCRIPTION OF PREFERRED EMBODIMENTS

Figure 1:
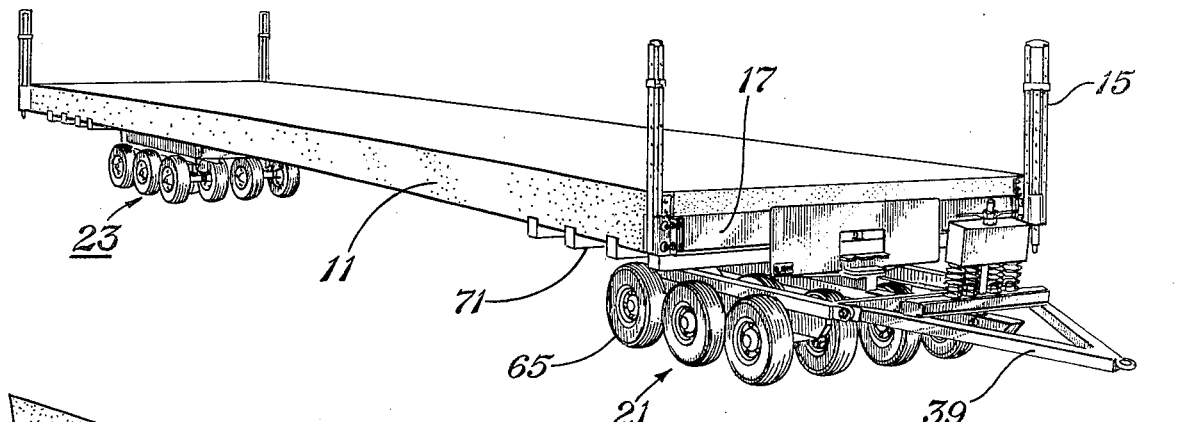
FIG. 1 is a perspective view of a trailer assembly constructed in accordance with this invention.
Figure 2:
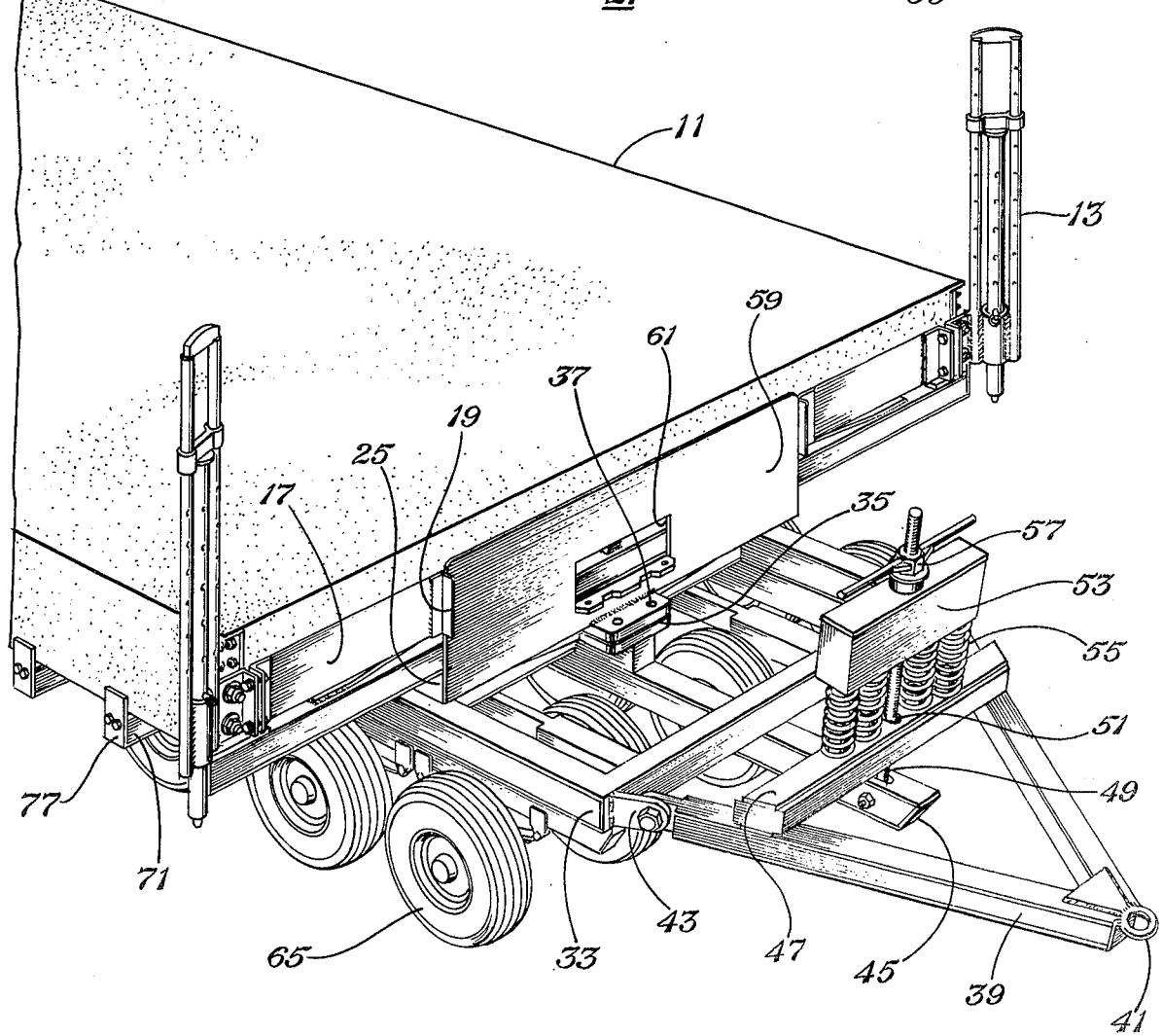
FIG. 2 is an enlarged partial perspective view of the front of the trailer of FIG. 1.

Referring to FIGS. 1 and 2, the trailer assembly is shown carrying a concrete slab 11 for a building. Slab 11 is a solid single piece of concrete with longitudinal beams 13 (FIG. 7), formed on the side edges. Jacks 15 are mounted on each corner for raising and lowering the slab 11. A protector plate 17 is bolted to the front and rear of slab 11. A pair of flanges 19 are spaced apart on plate 17 and extend outward.

Figure 7:
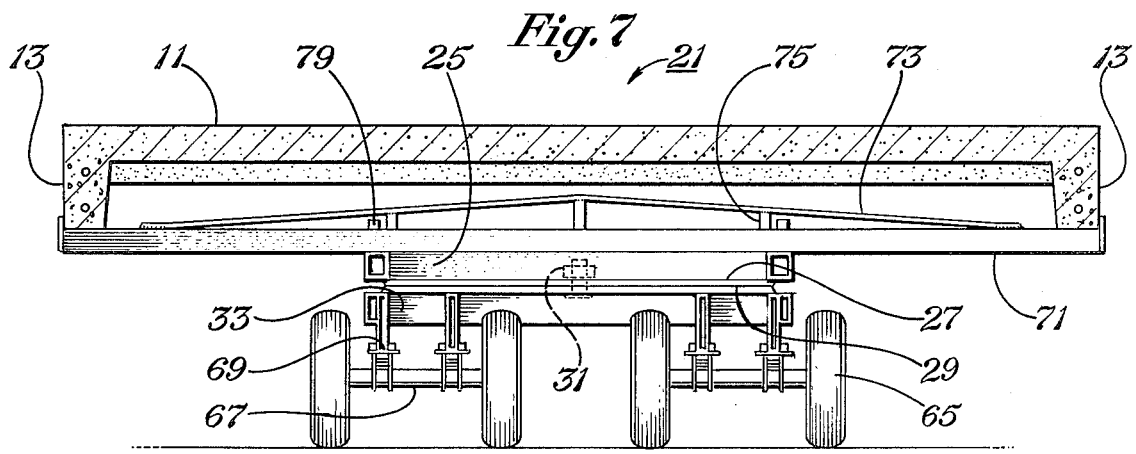
FIG. 7 is a sectional view of the trailer assembly of FIG. 1, taken along the line VII—VII of FIG. 3.

The undercarriage or trailer assembly for carrying the slab 11 includes a front unit 21 and a rear unit 23. Referring to FIGS. 3, 5 and 7, the front unit has a generally rectangular upper frame 25 of rectangular tubular members. A circular plate 27 is secured to the bottom of the upper frame 25. Plate 27 rests on a lower circular plate 29 (FIG. 7), and is bolted thereto by bolt 31. Lower circular plate 29 is secured to a lower rectangular frame 33 of rectangular tubular members. Plates 27 and 29 are greased in their mating surfaces to allow the lower frame to turn with respect to the upper frame.

Referring again to FIG. 1, a pair of mating tabs 35 extend forwardly from the upper and lower frames 25, 33 and contain apertures 37 for receiving pins to lock the frames together if desired. A tow bar or tongue 39 is hingedly connected to the front end of the lower frame 33. Tongue 39 is "V" shaped having two legs that converge into a ring 41, which serves as hitch means for connection to a tractor truck. The tractor will have a mating pintle (not shown). Each leg of tongue 39 is connected to lower frame 33 by a hinge 43. Hinges 43 allow the tongue to pivot vertically with respect to lower frame 33, but not horizontally.

A compression means urges the tongue 39 downward so that the hitch 41 will apply weight to the tractor. Weight is applied for various purposes, such as affording good interconnection, transferring part of the weight and traction. The compression member includes a beam 45 rigidly attached to lower frame 33 and extending forwardly beneath tongue 39. A transverse member 47 is secured across the legs of tongue 39 above beam 45. A threaded rod 49 is pivotally connected to the end of beam 45. It extends vertically through an aperture 51 in transverse member 47, and through a second aperture in a plate or housing 53 carried about the transverse member 47. Four coil springs 55 are carried between the housing 53 and transverse member 47. A nut 57 with handles is threaded to rod 49 and bears against the top of housing 53. Tightening nut 57 lowers housing 53. Depending on where the housing 53 is positioned, in order to lift tongue 39, the springs 55 will have to be compressed.

A vertical plate 59 is secured to upper frame 25. Its width is selected to fit within the spaces between flanges 19 to prevent lateral shifting. The slab 11, with its protector plate 17, bears against plate 59. Plate 59 has a rectangular opening 61 in its lower center.

Figure 6:
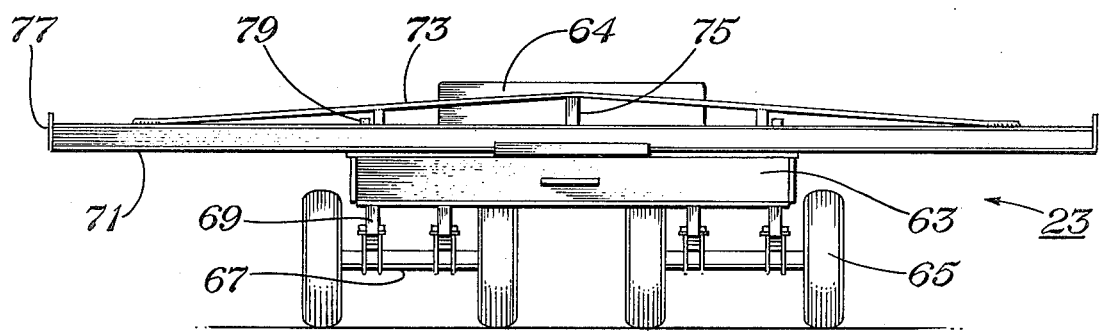
FIG. 6 is an end elevational view of the rear unit of the trailer assembly of FIG. 1.

The rear unit 23 includes a rectangular frame 63 of rectangular tubular members. A vertical plate 64 is located on a first end of the rear unit 23. Frame 63 and the lower frame 33 of the first unit 21 are each mounted on three sets of tandem wheels 65. Referring to FIGS. 6 and 7, two pairs of wheels with an axle 67 between each pair comprise each set. Two leaf springs 69 are secured to each axle 67 and to a frame member. Consequently twelve wheels will be located under each unit. The distance from the outer edge of one outer wheel to the outer edge of the other outer wheel is preferably the legal width of eight feet.

Referring to FIGS. 6 and 7, a plurality of cross members 71 are releasably fastened to the upper frame 25 of the forward unit 21, and to the frame 63 of the rear unit 23. Each cross member is an elongated rigid beam of rectangular tubing of length greater than the distance between the outer edges of the wheels 65. A typical length is 14 feet. Each cross member includes a rod 73 welded to the tubing upper surface. Rod 73 is supported above the upper surface of the rectangular tubing by three supports 75, of which the center support is the tallest. This creates a peak in rod 73 of maximum height in the center of the cross member. The outer ends of cross member 71 contain caps 77 that extend upward past the upper surface of the cross member tubing. The beams 13 of slab 11 rest in the space between cap 77 and the commencement of rod 73.

The four cross members 71 on each unit 21, 23 are adapted to be selectively connected to the units in both the load position and the storage position. In the load position, the cross members are perpendicular to the longitudinal axis of the units, as shown in FIGS. 1-3 and 6-8. In the load position, the cross members are spaced apart and bolted to the upper frame 25 of the forward unit 21 and to the frame 63 of the rear unit 23. Bolts 79 serve as mounting means for securing the cross members to the units in the load position.

In the storage position as shown in FIGS. 4 and 5, the cross members 71 on the front unit 21 are placed in contact with each other and bolted to the upper frame 25 parallel to the longitudinal axis of the frame 25. One end of each cross member is inserted through the opening 61 in vertical plate 59. Opening 61 is of height less than the height of the cross member 71 at the peak of its rod 73, thus the cross members cannot slide forward should a sudden stop be required, even if the mountings are sheared. The cross members 71 are mounted in the storage position by bands 81, 83 (FIG. 4) that insert over the cross members and are bolted to the upper frame 25.

The four cross members of the rear unit 23 are also placed parallel to the longitudinal axis of the unit while in the storage position. They are secured by bands 85, 87 which are bolted to the frame 63. One end of each cross member is in substantial contact with vertical plate 64, to prevent forward movement should a sudden stop occur. Plate 64 will be located on the forward end while in the storage position, since the trailer is towed in reverse for empty trips. Bands 81, 83, 85 and 87, along with their associated bolts and holes serve as the mounting means for mounting the cross members in the storage position. These bands, and bolts 79, which mount the cross members 71 in the load position, serve as conversion means for selectively shifting the cross members 71 between the storage position and the load position.

In the load position, as shown in FIG. 3, the front unit 21 and rear unit 23 are connected together by a cable or chain 89 that extends from frame 63 of the rear unit 23 to frame 25 of the front unit 21. The chain is tensioned against slab 11 by a boom 91. Although shown as a single chain, a plurality of chains can be employed to meet regulatory requirements, for safety, and the like.

In the storage position, as shown in FIGS. 4 and 5, the tow means for towing the rear unit 23 comprises a tongue 93. Tongue 93 has a hitch 95 on its end for connection to the rear end of front unit 21. Tongue 93 fits telescopingly in frame 63 on the same end of the rear unit 23 as vertical plate 64. Tongue 93 can be inserted into the frame structure so that its hitch 95 is substantially flush with the end of the rear unit 23 for the load position.

In operation, to transport a slab 11, initially protector plates 17 are bolted to the front and rear edges. These may be secured to the anchor plates for the slab tension rods. Jacks 15 are bolted to the anchor plates and are then used to raise the slab above the ground. Cross members 71 are bolted transverse to the frames of the units, then the units are manuvered into position below the slab. The slab is lowered onto the cross members 71 by the jacks, then the chain 89 is tensioned to draw the vertical plates 59, 64 tightly against the front and rear edges of slab 11.

The nut 59 of the compression device is loosened sufficiently for the ring to be connected to the tractor hitch means. Once in place, the nut is tightened, compressing springs 55 and applying weight to the rear of the towing vehicle. Once the desired weight has been applied for the proper traction, the unit can be locked into place. In the preferred embodiment, the compression device is capable of applying 8,000 pounds of weight.

While towing to the site, the wheels 65 of the front unit 21 are free to turn with respect to the slab for turning corners. Also ring 41 of tongue 39 allows the tractor to turn with respect to the front unit. Once at the site, the jacks are used to raise the slab from the front and rear units. Chain 89 is disconnected and forward unit 21 can be removed by pulling forwardly. The rear unit can be removed by pulling rearwardly, using the telescoping tongue 93. The slab is then lowered until its beams 13 rest on the ground.

For returning at legal width, the cross members 71 are removed from the load position and placed on the front and rear units as shown in FIGS. 5 and 6. Bands 81, 83, 85 and 87 are bolted over the cross members to secure them to the frames 25 and 63. The telescoping tongue 93 is hitched to the rear end of the front unit 21. The trailer assembly, now of legal width, can be towed back to the place of departure. Note that in the empty return trip, the rear unit is towed reverse to the direction of travel while loaded.

Figure 8:
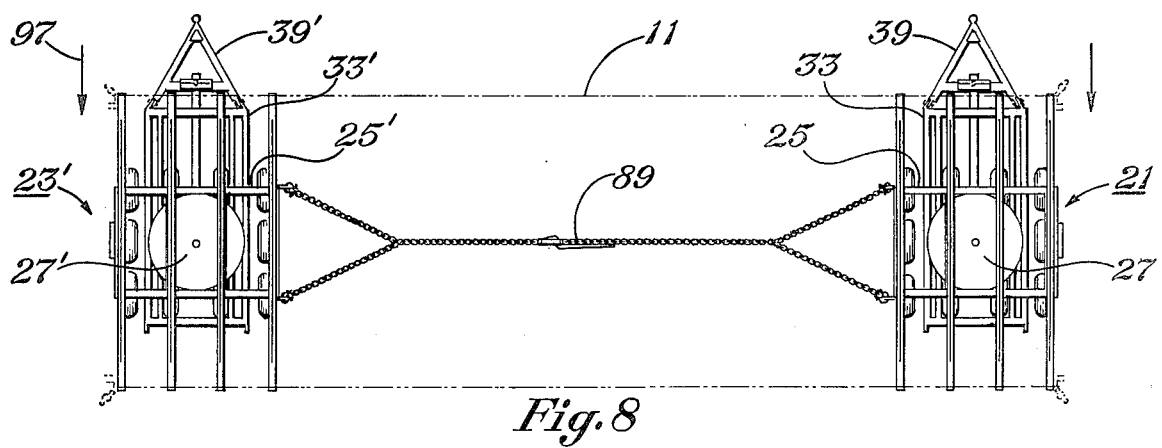
FIG. 8 is a reduced top plan view of an alternate embodiment of the trailer assembly of FIG. 1.

In FIG. 8, slab 11 is shown being moved laterally, as indicated by arrows 97. This arrangement can be used in places where insufficient room exists for forward and rear movement. In this arrangement, front unit 21 is identical to the front unit used in the embodiment of FIGS. 1–7. The rear unit 23', however, is another front unit in that it has an upper frame 25' that is rotatable with respect to the lower frame 33'. The units are boomed together by a chain 89 extending between their upper frames. During normal towing, the tongue 39' can be removed from the rear unit 23'. Pins can be inserted in the holes 37 and tabs 35 (FIG. 2) to lock the upper and lower frames 25' and 33' of the rear unit together during normal towing. When at the site, the pins 37 can be removed, and hitch 39' attached. The wheels can be turned 90° with respect to the slab by the use of a winch line. A second truck or other moving means can be used to push or pull the slab laterally in cooperation with the tractor connected to the front unit. Once in place, the front and rear units can be removed as previously explained.

In place of a hitch 39' for the alternate embodiment, a hydraulic cylinder could be used for turning the wheels of the rear unit 23'. The rear unit could then be pulled laterally by winching rather than by using a second tractor.

It should be apparent that an invention having significant advantages has been provided. The trailer assembly is suited for hauling any load; and is particularly advantageous in hauling overwidth loads and returning empty at legal width. The trailer assembly provides support for the load both at the front and rear, as well as lateral support beyond the wheel edges. The height of the trailer assembly is low since a large number of relatively small diameter wheels are used, and since the tractor's conventional fifth wheel hitch means is not required. This allows the hauling of higher loads. The assembly can also be used to move a load laterally into narrow spots. The trailer assembly employs a large plurality of wheels and tires; for example, twelve per unit; in order to carry heavy loads with low compressive loading at the contact of the tires with the earth's surface on which they roll. This not only allows meeting highway standards, but also allows transporting the loads on "off-road" type terrain safely.

While the invention has been shown in only one of its forms, it should be apparent to those skilled in the art that it is not so limited but is susceptible to various changes and modifications without departing from the spirit thereof. For example rather than using rigid cross members that are moved from legal width to overwidth by remounting, telescoping cross members or folding cross members may be suitable. Where folding members are employed, they may fold in either the vertical or horizontal planes and about respective hinge shafts designed to carry the load.

I claim:

1. A trailer assembly for carrying loads, even overwidth loads, comprising in combination:
   a. a front unit having a lower frame mounted on a plurality of wheels;
   b. an upper frame rotatably mounted to the lower frame so as to allow the wheels and lower frame to be turned sufficiently to allow said front unit to be moved laterally for movement into a close space and at least 90° in either direction from straight ahead with respect to the upper frame;
   c. a tongue connected to the lower frame and having hitch means for connection to a towing vehicle;
   d. a rear unit having a frame mounted on a plurality of wheels, the rear unit being capable of being moved independently of the front unit;
   e. a plurality of cross members mounted to the upper frame of the front unit and the frame of the rear unit;
   f. conversion means for selectively shifting the cross members between a load position, wherein the ends of the cross members protrude beyond the edges of the wheels for supporting overwidth loads, and a storage position, wherein the ends do not extend past the outer edges of the wheels for trips while empty;
   g. front and rear laterally disposed flanges on the respective upper frame of the front and rear units at the respective front and rear portions thereof to move against overwidth loads; said front and rear flanges having means for fastening to said overwidth loads, the respective front and rear being determined by the particular assembly; and
   h. tow means for towing the rear unit with the first trailer on empty trips.

2. The trailer assembly according to claim 1 the tongue is hingedly attached to the lower frame and wherein the trailer assembly further comprises:
   compression means mounted between the tongue and lower frame for urging the tongue downward to apply weight to the rear of the towing vehicle for traction.

3. The trailer assembly according to claim 2 wherein the tongue comprises two legs converging together at the hitch means, and wherein the compression means comprises:
   a. a transverse member extending across the legs and having an aperture therethrough;
   b. a beam rigidly connected to the lower frame and extending forwardly below the transverse member;
   c. a threaded rod connected to the beam and extending upwardly through the aperture;
   d. a plate having an aperture therethrough inserted over the rod above the transverse member;
   e. a coil spring mounted between the plate and the transverse member; and
   f. a nut threaded to the rod above the plate, whereby rotation of the nut increases and decreases the distance between the plate and the beam, increasing and decreasing the force required to lift the tongue.

4. The trailer assembly according to claim 1 wherein the tow means comprises a telescoping tongue mounted in the rear unit.

5. The trailer assembly according to claim 1 wherein the cross members are rigid beams of length greater than the distance between the outer edges of the outer wheels, and wherein the conversion means comprises first mounting means for securing the beams transverse to the longitudinal axis of the units for the loaded position, and second mounting means for securing the beams parallel to the longitudinal axis of the units for the storage position.

6. The trailer assembly according to claim 1 wherein the rear unit contains an upper frame and a lower frame rotatably secured together and with the wheels attached to the lower frame so that the lower frame and attached wheels can turn sufficiently to allow the trailer assembly and any load to be moved laterally into close spaces and at least 90° in any direction from a straight ahead with respect to the upper frame, allowing the load to be laterally moved into place, the rear unit containing locking means for selectively preventing turning during towing on the road.

7. A trailer assembly for carrying overwidth loads, comprising in combination:
   a. a front unit having a lower frame mounted on a set of tandem wheels;
   b. an upper frame rotatably mounted to the lower frame so as to allow the wheels and lower frame to be turned with respect to the upper frame;
   c. a front vertical plate mounted to the upper frame, against which the front edge of the load is adapted to be abutted;
   d. a tongue connected to the lower frame and having hitch means for connection to a towing vehicle, the tongue being hinged to the lower frame so as to allow vertical pivoting, but not horizontal pivoting, with respect to the lower frame;
   e. compression means mounted between the tongue and the lower frame for urging the tongue downward to apply weight to the rear of the towing vehicle for traction;
   f. a rear unit having a frame mounted on a set of tandem wheels, the rear unit being capable of being moved independently of the front unit;
   g. a rear vertical plate mounted to the frame of the rear unit on a first end, against which the rear edge of the load is adapted to be abutted;
   h. a retractable tongue mounted to the frame of the rear unit on the first end, the tongue being movable between a storage position substantially flush with the frame, and an extended position wherein it is adapted to be connected to the rear end of the forward unit;
   i. a plurality of cross members, each cross member being of length greater than the distance between the outer edges of the wheels of the units;
   j. first mounting means for selectively securing the cross members to the upper frame of the front unit and to the frame of the rear unit perpendicular to the longitudinal axis of the units, defining the load position, for supporting overwidth loads; and
   k. second mounting means for selectively securing the cross members to the upper frame of the forward unit and to the frame of the rear unit parallel to the longitudinal axis of the units, defining the storage position;
   l. the rear unit having a second end that leads the first end while the units are in the load position, and lags the first end while the units are being towed empty, with the cross members in the storage position.

8. The trailer assembly according to claim 7 wherein the cross members taper in height from the ends to a peak in the center, and wherein the front vertical plate has an aperture therethrough for receiving one end of the cross members on the front unit in the storage position, the aperture being of less height than the peak of the cross members so as to prevent forward movement of the cross members should the towing vehicle be quickly stopped, the rear vertical plate preventing forward movement of the cross members on the rear unit.

9. The trailer assembly according to claim 7 wherein the load that the trailer is adapted to carry is a large rectangular concrete slab.

10. The trailer assembly according to claim 7 wherein in the load position, the front and rear units are linked together solely by a cable and by the load itself.

* * * * *